US010118606B2

(12) United States Patent
Ogawa

(10) Patent No.: US 10,118,606 B2
(45) Date of Patent: Nov. 6, 2018

(54) MOVEMENT SUPPORT APPARATUS, MOVEMENT SUPPORT METHOD, AND DRIVING SUPPORT SYSTEM

(71) Applicant: TOYOTA JIDOSHA KABUSHIKI KAISHA, Toyota-shi, Aichi-ken (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 15/028,140

(22) PCT Filed: Oct. 13, 2014

(86) PCT No.: PCT/IB2014/002073
§ 371 (c)(1),
(2) Date: Apr. 8, 2016

(87) PCT Pub. No.: WO2015/059536
PCT Pub. Date: Apr. 30, 2015

(65) Prior Publication Data
US 2016/0257301 A1 Sep. 8, 2016

(30) Foreign Application Priority Data

Oct. 21, 2013 (JP) ................. 2013-218428

(51) Int. Cl.
*B60W 30/00* (2006.01)
*B60W 20/40* (2016.01)
(Continued)

(52) U.S. Cl.
CPC ............ *B60W 20/40* (2013.01); *B60W 20/12* (2016.01); *B60W 20/14* (2016.01);
(Continued)

(58) Field of Classification Search
None
See application file for complete search history.

(56) References Cited

U.S. PATENT DOCUMENTS 7,360,615 B2 * 4/2008 Salman .................... B60K 6/52
180/65.265
7,610,124 B2 * 10/2009 Wakashiro ............ B60K 6/485
701/22

(Continued)

FOREIGN PATENT DOCUMENTS

DE 102009028922 A1 3/2011
JP 2006-306231 A 11/2006
(Continued)

Primary Examiner — Jonathan M Dager
(74) Attorney, Agent, or Firm — Oliff PLC

(57) ABSTRACT

An apparatus includes an unit that plans any driving mode of an EV mode in which the motor is used as the drive source and an HV mode in which at least the engine is used as the drive source for each section, into which a route from the current location to the destination is partitioned, when a load for running in each section is set. The setup unit plans the mode using an aspect in which the HV mode is preferentially planned for a section including at least one of a current section including the current location and a section after the current section when a remaining amount of the battery is lower than a threshold of the remaining amount of the battery, and regenerative energy obtained from running load information is higher than or equal to a value determining a restoration of the remaining amount of the battery.

9 Claims, 7 Drawing Sheets

(51) Int. Cl.
*B60W 20/12* (2016.01)
*B60W 20/14* (2016.01)

(52) U.S. Cl.
CPC . *B60W 2510/244* (2013.01); *B60W 2550/143* (2013.01); *B60W 2550/402* (2013.01); *Y02T 10/7258* (2013.01)

(56) References Cited

U.S. PATENT DOCUMENTS

| | | | | |
|---|---|---|---|---|
| 7,958,958 | B2* | 6/2011 | de la Torre Bueno | B60K 6/46 180/65.29 |
| 8,269,641 | B2* | 9/2012 | Bauman | H02J 7/14 180/65.29 |
| 8,571,748 | B2* | 10/2013 | Kluge | G01C 21/3469 180/271 |
| 9,067,589 | B1* | 6/2015 | Zhao | B60W 20/104 |
| 9,327,712 | B2* | 5/2016 | Matthews | B60W 20/00 |
| 9,527,399 | B2* | 12/2016 | Kim | B60L 11/1862 |
| 9,701,302 | B2* | 7/2017 | Matsunaga | G01C 21/3469 |
| 9,702,718 | B2* | 7/2017 | Payne | G01C 21/3469 |
| 9,714,024 | B2* | 7/2017 | Yoon | B60K 6/547 |
| 9,816,474 | B2* | 11/2017 | Khafagy | F02N 11/0833 |
| 9,821,791 | B2* | 11/2017 | Dextreit | B60W 50/0097 |
| 9,878,631 | B2* | 1/2018 | Hyde | B60L 11/1861 |
| 9,896,086 | B2* | 2/2018 | Ogawa | B60L 11/1862 |
| 9,969,271 | B2* | 5/2018 | Ogawa | B60L 7/20 |
| 2007/0294026 | A1* | 12/2007 | Schirmer | B60W 10/06 701/533 |
| 2008/0119982 | A1* | 5/2008 | Yamada | B60L 3/12 701/33.4 |
| 2008/0243331 | A1* | 10/2008 | Kato | B60L 11/123 701/29.5 |
| 2008/0319596 | A1* | 12/2008 | Yamada | B60K 6/442 701/22 |
| 2008/0319597 | A1* | 12/2008 | Yamada | B60K 6/46 701/22 |
| 2010/0121514 | A1* | 5/2010 | Kato | B60K 6/48 701/22 |
| 2010/0179714 | A1* | 7/2010 | Tani | B60K 6/365 701/22 |
| 2010/0185384 | A1* | 7/2010 | Naito | G01C 21/26 701/532 |
| 2010/0305799 | A1* | 12/2010 | Yamada | B60K 6/46 701/22 |
| 2011/0022255 | A1* | 1/2011 | Yamada | B60K 6/46 701/22 |
| 2011/0066310 | A1* | 3/2011 | Sakai | B60L 1/00 701/22 |
| 2011/0184600 | A1* | 7/2011 | Kristinsson | G01C 21/3469 701/22 |
| 2011/0288712 | A1* | 11/2011 | Wang | B60K 6/445 701/22 |
| 2011/0288737 | A1* | 11/2011 | Carr | B60W 30/182 701/99 |
| 2012/0010767 | A1* | 1/2012 | Phillips | G01C 21/3469 701/22 |
| 2012/0035795 | A1* | 2/2012 | Yu | B60W 50/0097 701/22 |
| 2012/0323413 | A1* | 12/2012 | Kedar-Dongarkar | B60K 6/442 701/22 |
| 2013/0024055 | A1* | 1/2013 | Hysko, Jr. | B60W 50/0097 701/22 |
| 2013/0116870 | A1* | 5/2013 | Harty | B60W 10/06 701/22 |
| 2013/0274952 | A1* | 10/2013 | Weslati | B60W 50/0097 701/1 |
| 2014/0046518 | A1* | 2/2014 | Roos | B60W 30/182 701/22 |
| 2014/0288742 | A1* | 9/2014 | Hokoi | B60W 20/40 701/22 |
| 2015/0039169 | A1* | 2/2015 | Dextreit | B60W 50/0097 701/22 |
| 2015/0066270 | A1* | 3/2015 | Ogawa | B60W 20/00 701/22 |
| 2015/0097512 | A1* | 4/2015 | Li | B60L 11/182 320/101 |
| 2015/0239365 | A1* | 8/2015 | Hyde | B60L 11/1861 701/2 |
| 2015/0275788 | A1* | 10/2015 | Dufford | F02D 29/02 701/102 |
| 2016/0082947 | A1* | 3/2016 | Naumann | G01C 21/3469 701/22 |
| 2016/0221567 | A1* | 8/2016 | Ogawa | B60W 20/40 |
| 2016/0221568 | A1* | 8/2016 | Ogawa | B60W 50/0097 |
| 2016/0229389 | A1* | 8/2016 | Hirano | B60L 11/1862 |
| 2016/0245662 | A1* | 8/2016 | Rajagopalan | G01C 21/3469 |
| 2016/0325637 | A1* | 11/2016 | Payne | G01C 21/3469 |
| 2017/0021820 | A1* | 1/2017 | Ogawa | B60L 11/1861 |
| 2017/0028981 | A1* | 2/2017 | Ogawa | B60K 6/445 |
| 2017/0355358 | A1* | 12/2017 | Ogawa | B60L 11/14 |
| 2018/0134274 | A1* | 5/2018 | Ogawa | B60W 20/12 |

FOREIGN PATENT DOCUMENTS

| | | |
|---|---|---|
| JP | 2009-001099 A | 1/2009 |
| JP | 2009-012605 A | 1/2009 |
| JP | 2013-159214 A | 8/2013 |
| JP | 2015-030407 A | 2/2015 |
| WO | 2015/019142 A | 2/2015 |

* cited by examiner

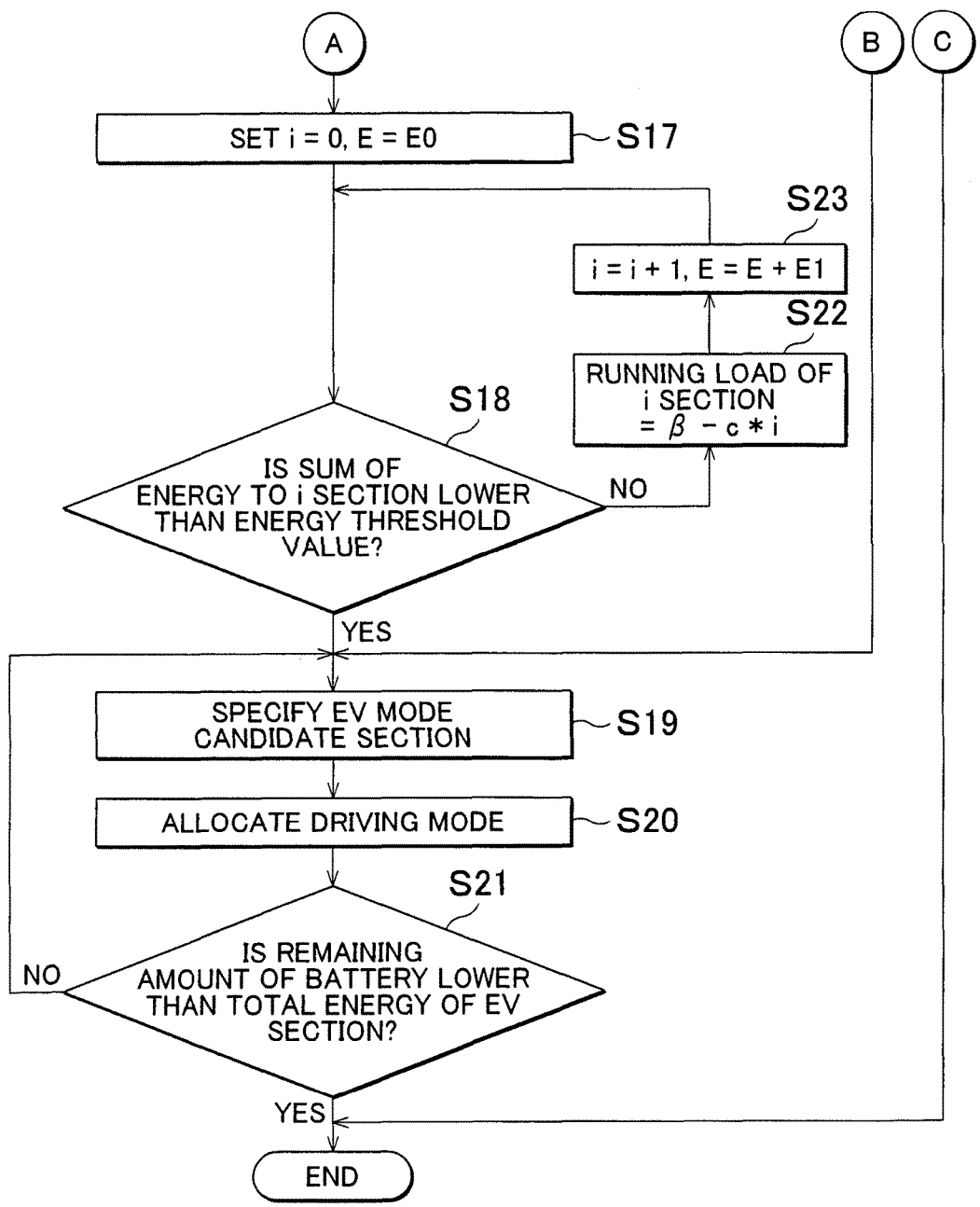

F I G . 4

ENERGY CONSUMPTION OF EACH SECTION IN EV MODE

| SECTION | k1 | k2 | k3 | k4 | k5 |
|---|---|---|---|---|---|
| ENERGY CONSUMPTION | 1200 | −1000 | 800 | 1000 | 200 |
| SUM | 1200 | 200 | 1000 | 2000 | 2200 |

F I G . 5

RANKINGS OF EACH SECTION IN ORDER OF RUNNING LOAD FROM LOWEST TO HIGHEST

| SECTION | k1 | k2 | k3 | k4 | k5 |
|---|---|---|---|---|---|
| BEFORE CHANGING | 3 | 1 | 4 | 5 | 2 |
| AFTER CHANGING | 5 | 1 | 3 | 4 | 2 |

FIG. 6

VALUE OBTAINED BY ADDING UP ENERGY CONSUMPTION IN SEQUENCE FROM SECTION IN WHICH RUNNING LOAD BEFORE BEING CHANGED IS LOW

| RANKING | 1 | 2 | 3 | 4 | 5 |
|---|---|---|---|---|---|
| SECTION | k2 | k5 | k1 | k3 | k4 |
| ENERGY CONSUMPTION | −1000 | 200 | 1200 | 800 | 1000 |
| SUM | −1000 | −800 | 400 | 1200 | 2200 |

FIG. 7

DRIVING MODE OF EACH SECTION BEFORE BEING CHANGED

| SECTION | k1 | k2 | k3 | k4 | k5 |
|---|---|---|---|---|---|
| SETUP | EV | EV | EV | HV | HV |
| CONTROL | EV | HV | HV | HV | HV |

← USE UP BATTERY

F I G . 8

VALUE OBTAINED BY ADDING UP ENERGY CONSUMPTION IN SEQUENCE
FROM SECTION IN WHICH RUNNING LOAD AFTER BEING CHANGED IS LOW

| RANKING | 1 | 2 | 3 | 4 | 5 |
|---|---|---|---|---|---|
| SECTION | k2 | k5 | k3 | k4 | k1 |
| ENERGY CONSUMPTION | −1000 | 200 | 800 | 1000 | 1200 |
| SUM | −1000 | −800 | 0 | 1000 | 2200 |

F I G . 9

DRIVING MODE, ENERGY CONSUMPTION, AND REMAINING
AMOUNT OF BATTERY OF EACH SECTION AFTER BEING CHANGED

| SECTION | k1 | k2 | k3 | k4 | k5 |
|---|---|---|---|---|---|
| SETUP | HV | EV | EV | EV | EV |
| CONTROL | HV | EV | EV | EV | EV |
| ENERGY CONSUMPTION | 0 | −1000 | 800 | 1000 | 200 |
| REMAINING AMOUNT OF BATTERY | 1000 | 2000 | 1200 | 200 | 0 |

MOVEMENT SUPPORT APPARATUS, MOVEMENT SUPPORT METHOD, AND DRIVING SUPPORT SYSTEM

BACKGROUND OF THE INVENTION

1. Field of the Invention

The present invention relates to a movement support apparatus, a movement support method, and a driving support system including a movement support function.

2. Description of Related Art

As a vehicle having plural driving modes, a hybrid vehicle is known which uses an internal combustion engine and a motor as a drive source in parallel. The hybrid vehicle has a first mode (HV mode) in which only the internal combustion engine is used or the internal combustion engine and the motor are simultaneously used and a second mode (EV mode) in which the internal combustion engine is stopped and only the motor is used as the plural driving modes. A movement support apparatus including a navigation system mounted in the hybrid vehicle calculates a driving route from a current location to a destination on the basis of map information or road traffic information, or the like and performs supports of selecting a driving mode to be applied to sections into which the driving route is partitioned. For example, Japanese Patent Application Publication No. 2009-12605 (JP 2009-12605 A) describes an example of a controller of the vehicle having the movement support function.

However, in the controller of the vehicle described in JP 2009-12605 A, the driving mode of each section of the driving route is set in consideration of balancing energy consumption during the entire driving route so that a state of charge of a battery, which is a secondary battery, at the destination approaches the lower limit. However, in the energy balance of the entire driving route, collecting regenerative energy in a downward slope is included. For this reason, when the remaining amount of the battery is expected to be increased by collecting the regenerative energy and travelling in an EV mode is set up, the remaining amount of the battery up to a section before a section in which the regenerative energy is able to be collected may reach a lower limit value, and thus it is difficult to travel in the subsequent section in the EV mode.

This problem is common in an apparatus or a method of allocating a driving mode in a vehicle with plural driving modes having different energy balances.

SUMMARY OF THE INVENTION

The present invention is to provide a movement support apparatus, a movement support method, and a driving support system having a movement support function, which allocate a suitable driving mode for each section.

A first aspect of the invention relates to a movement support apparatus that supports movement of a vehicle having an internal combustion engine and a motor as drive sources from a current location to a destination. The movement support apparatus includes a setup unit that sets up any driving mode of an EV mode in which the motor using a battery is used as the drive source and an HV mode in which at least the internal combustion engine is used as the drive source for each section, into which a driving route from the current location to the destination is partitioned, when a running load for running in each section is set. The setup unit sets up the driving mode using an aspect in which the HV mode is preferentially set up for a section including at least any one of a current section including the current location and a section after the current section when a remaining amount of the battery is lower than a remaining amount threshold value which is a determination value of the remaining amount of the battery, and regenerative energy obtained from information of the running load is higher than or equal to a regenerative threshold value which is a determination value for restoration from the remaining amount of the battery.

A second aspect of the invention relates to a movement support method which supports a movement from a current location to a destination of a vehicle including an internal combustion engine and a motor as a driving source. The movement support method includes: setting up any one driving mode of an EV mode including the motor using a battery as the driving source and an HV mode including at least the internal combustion engine as the driving source for each section while setting a running load at the time of travelling in each of the sections in the EV mode as the driving mode, in each of the sections into which a driving route from the current location to the destination is divided; and setting up the driving mode using an aspect in which the HV mode is preferentially set up for a section including at least any one of a current section including the current location and a section after the current section when a remaining amount of the battery is lower than a remaining amount threshold value which is a determination value of the remaining amount of the battery, and regenerative energy obtained from information of the running load is higher than or equal to a regenerative threshold value which is a determination value of a restoration of the remaining amount of the battery.

In the movement support apparatus, the setup unit may perform setting up of the driving mode under a condition in which a distance to the destination is longer than or equal to a predetermined distance. In the movement support method, the driving mode may be set up under a condition in which a distance to the destination is longer than or equal to a predetermined distance.

In the movement support apparatus, the setup unit may add up the energy consumption in sequence from each of the sections closer to the current location on the driving route, a virtual running load which is higher than the running load of each of the sections is set in a section in which the total energy consumption is higher than a predetermined threshold value, the EV mode may be set up for the driving mode of a section in which the running load including the virtual running load is relatively low among each of the sections on the driving route, and the HV mode may be set up for the driving mode of other sections.

In the movement support apparatus, the setup unit may set the virtual running load to be low in sequence from sections closer to the current location on the driving route.

A third aspect of the invention relates to a movement support apparatus that supports a movement from a current location to a destination of a vehicle including an internal combustion engine and a motor as a driving source. The movement support apparatus includes a setup unit which sets up any one driving mode of an EV mode including the motor using a battery as the driving source and an HV mode including at least the internal combustion engine as the driving source for each section while setting a running load at the time of travelling in each of the sections in the EV mode as the driving mode, in each of the sections into which a driving route from the current location to the destination is divided. The setup unit sets up the driving mode using an aspect in which the HV mode is preferentially set up for a section before a section in which regenerative energy is obtained when a remaining amount of the battery is lower than a remaining amount threshold value which is a determination value of the remaining amount of the battery, and the regenerative energy obtained from information of the running load is higher than or equal to a regenerative threshold value which is a determination value of a restoration of the remaining amount of the battery.

A fourth aspect of the invention relates to a movement support method that supports a movement from a current location to a destination of a vehicle including an internal combustion engine and a motor as a driving source. The movement support method includes: setting up any one driving mode of an EV mode including the motor using a battery as the driving source and an HV mode including at least the internal combustion engine as the driving source for each section while setting a running load at the time of travelling in each of the sections in the EV mode as the driving mode, in each of the sections into which a driving route from the current location to the destination is divided; and setting up the driving mode using an aspect in which the HV mode is preferentially set up for a section before a section in which regenerative energy is obtained when a remaining amount of the battery is lower than a remaining amount threshold value which is a determination value of the remaining amount of the battery, and the regenerative energy obtained from information of the running load is higher than or equal to a regenerative threshold value which is a determination value of a restoration of the remaining amount of the battery.

A fifth aspect of the invention relates to a driving support system that supports driving of a vehicle on the basis of one driving mode selected from a plurality of different driving modes set up for each section into which a driving route from a current location to a destination of the vehicle including an internal combustion engine and a motor as a driving source is divided. The driving support system includes a movement support apparatus that sets up the one driving mode selected from the plurality of driving modes for each of the sections on the driving route. The movement support apparatus includes a setup unit that sets up any driving mode of an EV mode in which the motor using a battery is used as the drive source and an HV mode in which at least the internal combustion engine is used as the drive source for each section, into which a driving route from the current location to the destination is partitioned, when a running load for running in each section is set, the setup unit sets up the driving mode using an aspect in which the HV mode is preferentially set up for a section including at least any one of a current section including the current location and a section after the current section when a remaining amount of the battery is lower than a remaining amount threshold value which is a determination value of the remaining amount of the battery, and regenerative energy obtained from information of the running load is higher than or equal to a regenerative threshold value which is a determination value of a restoration of the remaining amount of the battery.

According to the aspect described above, even when the regenerative energy is expected to be collected in the driving route with respect to the vehicle including the plurality of driving modes, it is possible to support driving of the vehicle while allocating a suitable driving mode for each of the sections.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 2A and 2B are flowcharts illustrating a processing procedure with respect to a setting-up process of a driving mode by the movement support apparatus according to the embodiment;

FIG. 4 is a diagram illustrating an example of energy consumption of each section on the driving route in an EV mode;

FIG. 5 is a diagram illustrating rankings of each of the sections on the driving route in order of the running loads from the lowest to the highest;

FIG. 6 is a diagram illustrating a value obtained by adding up the energy consumption in sequence from a section having the lowest running load before changing a plan of the driving mode;

FIG. 7 is a diagram illustrating an example of the driving mode of each of the sections before changing the plan of the driving mode:

FIG. 8 is a diagram illustrating a value obtained by adding up the energy consumption in sequence from the section having the lowest running load after changing the plan of the driving mode; and FIG. 9 is a diagram illustrating the driving mode the energy consumption, and a remaining amount of a battery of each of the sections after changing the plan of the driving mode.

DETAILED DESCRIPTION OF EMBODIMENTS

Hereinafter, a movement support apparatus, a movement support method, and a driving support system according to an embodiment of the invention will be described with reference to FIGS. 1 to 9. The movement support apparatus, the movement support method, and the driving support system according to this embodiment are applied to a hybrid vehicle having as drive sources an electric motor using a battery such as a secondary battery as a drive source and an internal combustion engine using gasoline or other fuel as a drive source.

Figure 1:
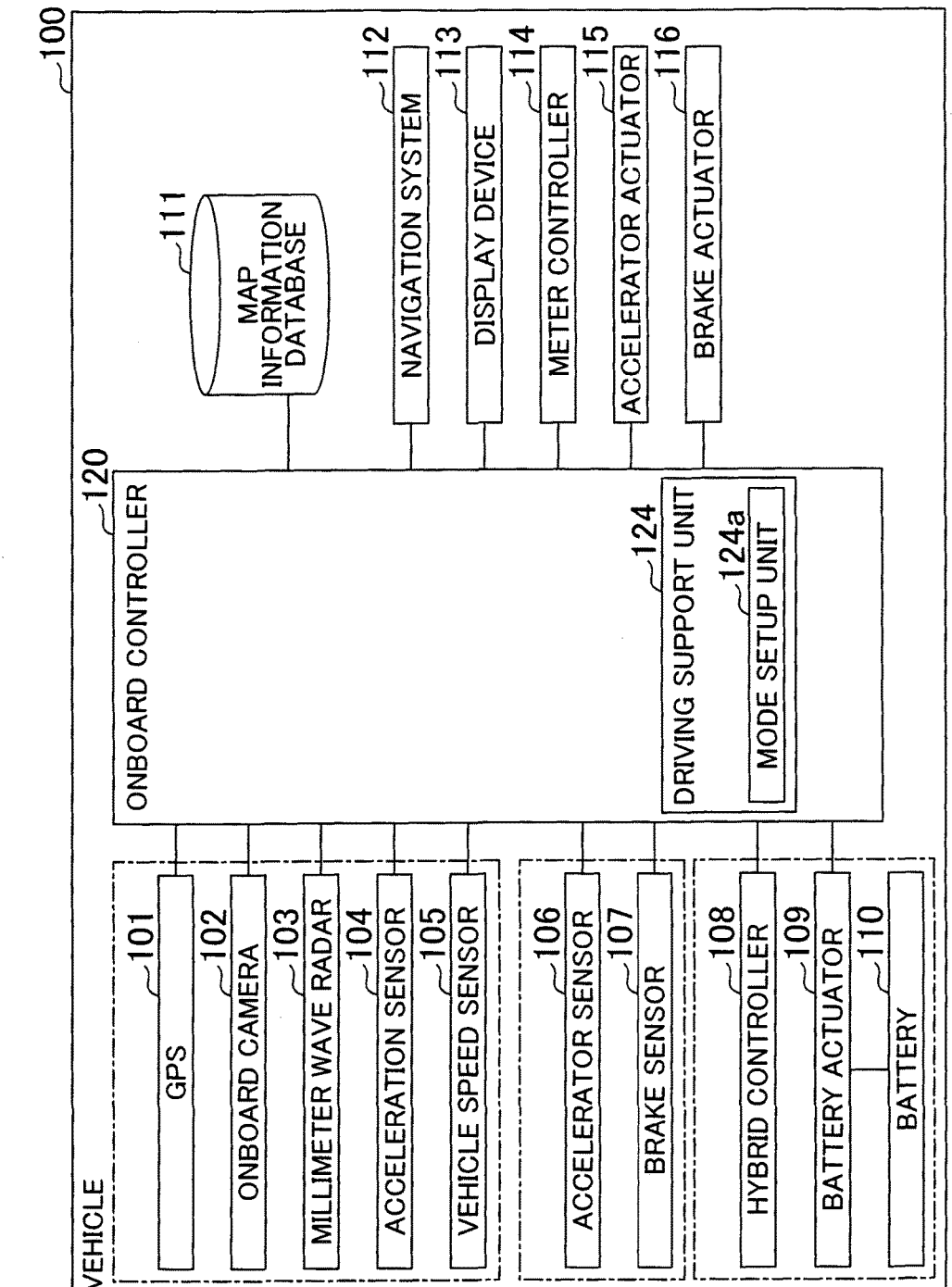
FIG. 1 is a block diagram illustrating a schematic configuration of a movement support apparatus according to an embodiment.

As illustrated in FIG. 1, the vehicle 100 is provided with, for example, a global positioning system (GPS) 101, an onboard camera 102, a millimeter wave radar 103, an acceleration sensor 104, and a vehicle speed sensor 105 as devices for detecting a running state of the vehicle 100. The GPS 101, the onboard camera 102, the millimeter wave radar 103, the acceleration sensor 104, and the vehicle speed sensor 105 are connected on an onboard controller 120 that controls various functions of the vehicle via an onboard network such as a controller area network (CAN). The onboard controller 120 is a so-called electronic control unit (ECU) and includes a microcomputer having a computation device and a storage device. The onboard controller 120 can perform various controls by causing the computation device to compute programs or parameters stored in the storage device.

The GPS 101 receives signals from GPS satellites and detects the position of the vehicle 100, for example, as latitude and longitude on the basis of the received signals from the GPS satellites. The GPS 101 outputs position information indicating the detected position (latitude and longitude) of the vehicle 100 to the onboard controller 120. The onboard camera 102 captures an image of a surrounding environment of the vehicle 100 and outputs the captured image data to the onboard controller 120. The millimeter wave radar 103 detects an object present around the vehicle 100 using radio waves of a millimeter waveband and outputs a signal corresponding to the detection result to the onboard controller 120.

The acceleration sensor 104 detects the acceleration of the vehicle 100 and outputs a signal corresponding to the detected acceleration to the onboard controller 120. The vehicle speed sensor 105 detects the rotation speed of vehicle wheels of the vehicle 100 and outputs a signal corresponding to the detected rotation speed to the onboard controller 120.

The accelerator sensor 106 detects a degree of operation of an accelerator pedal by a driver and outputs a signal corresponding to the detected degree of operation of the accelerator pedal to the onboard controller 120. The brake sensor 107 detects a degree of operation of a brake pedal by the driver and outputs a signal corresponding to the detected degree of operation of the brake pedal to the onboard controller 120.

The vehicle 100 is provided with an accelerator actuator 115 for controlling the operation state of the internal combustion engine and a brake actuator 116 for controlling the brake. The accelerator actuator 115 and the brake actuator 116 are electrically connected to the onboard controller 120. The accelerator actuator 115 controls the internal combustion engine on the basis of a control quantity of the internal combustion engine calculated by the onboard controller 120 based on the detected value of the accelerator sensor 106. The brake actuator 116 controls the brake on the basis of a control quantity of the brake calculated by the onboard controller 120 based on the detected value of the brake sensor 107.

The vehicle 100 is provided with a battery 110 as a drive source of an electric motor and a battery actuator 109 for controlling charging and discharging of the battery 110. The battery actuator 109 is electrically connected to the onboard controller 120. The battery actuator 109 manages the charging and discharging of the battery 110. The battery actuator 109 drives the electric motor by controlling the discharging of the battery 110 or charges the battery 110 by regeneration of the electric motor.

The vehicle 100 is provided with a hybrid controller 108 that controls the operation states of the internal combustion engine and the electric motor. The hybrid controller 108 is electrically connected to the onboard controller 120. That is, the hybrid controller 108 is electrically connected to the battery actuator 109, the accelerator actuator 115, and the brake actuator 116 via the onboard controller 120. The hybrid controller 108 is also a so-called ECU and includes a microcomputer having a computation device and a storage device. The hybrid controller 108 can perform various controls by causing the computation device to compute programs or parameters stored in the storage device.

The hybrid controller 108 determines a driving power distribution ratio (output ratio) of the internal combustion engine and the electric motor, for example, on the basis of the detection results of the acceleration sensor 104, the vehicle speed sensor 105, and the accelerator sensor 106 which are input from the onboard controller 120. Particularly, the hybrid controller 108 can adjust the state of charge of the battery 110 which is the residual energy of the battery 110 by changing the driving power distribution ratio (output ratio) of the internal combustion engine and the electric motor.

The hybrid controller 108 generates a control command for the battery actuator 109 relevant to discharging of, the battery 110 or information on the control quantity of the internal combustion engine calculated by the onboard controller 120 on the basis of the driving power distribution ratio. The hybrid controller 108 determines the braking force distribution ratio of the brake and the electric motor, for example, on the basis of the detection results of the acceleration sensor 104, the vehicle speed sensor 105, and the brake sensor 107 input from the onboard controller 120. The hybrid controller 108 generates a control command for the battery actuator 109 relevant to charging of the battery 110 or information on the control quantity of the brake calculated by the onboard controller 120 on the basis of the braking force distribution ratio. That is, the hybrid controller 108 controls the charging and discharging of the battery 110 by outputting the generated control commands to the battery actuator 109. Accordingly, the electric motor using the battery 110 as a drive source (power source) is driven by the discharging of the battery 110 or the battery 110 is charged by the regeneration of the electric motor. The onboard controller 120 can monitor the performance situation of the hybrid control or the state of charge of the battery 110.

The vehicle 100 includes an EV mode in which the vehicle 100 runs using the electric motor, which uses the battery 110 as a drive source, as a drive source and an HV mode in which the vehicle 100 runs using only the internal combustion engine or the electric motor and the internal combustion engine in parallel as a drive source. The hybrid controller 108 performs the control of switching the driving mode to the EV mode and the HV mode depending on the driver's selection result in the vehicle 100. The hybrid controller 108 has a function of automatically switching the driving mode to the EV mode and the HV mode and performs the control of switching the driving mode to the EV mode and the HV mode on the basis of information on running loads required for running in the sections of the driving route of the vehicle 100, which is input from the onboard controller 120. The running load is a load per unit distance in a section and is an average load required for running in the section. On the other hand, the accumulated value of the running load required for fully running in the section is defined as energy consumption.

However, the vehicle 100 includes map information database 11 in which map data is registered. The map data is data on geography such as roads. In the map data, information on a position such as latitude and longitude is registered along with data capable of displaying the geography. In the map data, information such as crossroad names, road names, direction names, direction guides, and facility information may be registered.

The map information database 111 includes node data which is information on nodes indicating positions on roads and link data which is information on links as a section between two nodes. The node is set as a position of a specific traffic element such as a crossroad, a traffic signal, and a curve, a point at which the number of lanes is changed, or the like. The node data includes position information of a node, road information of the position, and the like on a road. The link is set as a section between two nodes and defined by two nodes. The link data includes information of the two nodes, road information of the section of the link, and the like. The running load can be acquired or calculated from running load information included in the link data. The road information of the section of a link includes information such as a start point position, an end point position, a distance, a route, and undulations. The link data may include a variety of data such as cost data including the running load of a section as a link, road data including road types, mark data indicating a specific position, a crossroad data indicating information of a crossroad, and facility data indicating facility information.

Specifically, the node data may include, for example, a node ID as an identification number of a node, a coordinate of the node, link IDs of all links connected to the node, and a node type indicating the type of a crossroad or a merging point. The node data may include data indicating characteristics of the node such as an image ID which is an identification number of an image indicating the node.

The link data may include, for example, a link ID as an identification number of a link, a link length, and node IDs of nodes connected to the start point and the end point. The link data may include necessary information out of data indicating road types such as an express way, a toll road, a general road, a urban road/suburban road, and a mountain road, a road width, the number of lanes, a link running time, a legal speed limit, and the gradient of the road. The link data may include data indicating the average values, the maximum values, the minimum values, and the like of moving times, moving speeds, fuel consumption, and power consumption as the running load information which is a necessary output of the vehicle 100 in each link. The power consumption is an amount of power which is consumed by the electric motor when the vehicle 100 runs in the EV mode. The running load of a link (section) is acquired or calculated on the basis of the running load information. The running load is an average value in the link (section) and has a unit of [kW]. The energy consumption as the accumulated value of the running load required for fully running in each link (section) can be calculated from the running load and the link length (section length).

The vehicle 100 is provided with a navigation system 112 performing route guidance or the like. The navigation system 112 acquires the current point (latitude and longitude) of the vehicle 100 from the onboard controller 120 to which the detection result of the GPS 101 is input. The navigation system 112 specifies a target point (latitude and longitude) when the target point is set by the driver. Then, the navigation system 112 searches for the driving route from the current point of the vehicle 100 to the destination with reference to the map information database 111, for example, using a Dijkstra method. The navigation system 112 calculates, for example, the running load, the moving time, the moving speed, the fuel consumption, and the power consumption in the searched driving route. The navigation system 112 outputs information indicating the searched driving route, the calculated running load, moving time, moving speed, fuel consumption, and power consumption to the onboard controller 120 and outputs the information to a display device 113 constituted by a liquid crystal display disposed in the vehicle interior via the onboard controller 120.

The vehicle 100 is provided with a meter controller 114 that controls a display situation of a meter displayed on an instrument panel disposed in a dash board. The meter controller 114 acquires, for example, data indicating the charging and discharging state of the battery 110 from the onboard controller 120, and visually displays, for example, an energy flow in the vehicle 100 on the basis of the acquired data. The energy flow is a flow of energy in the vehicle 100 caused by the charging and discharging of the battery 110, the driving power/regeneration of the electric motor, and the like. The energy flow may include a flow of energy in the vehicle 100 caused by the driving power of the internal combustion engine.

When a driving route is input, the onboard controller 120 allocates the driving modes to the sections of the driving route. The onboard controller 120 includes a driving support unit 124 that supports the allocation of the driving modes based on the driving route. The driving support unit 124 acquires information of the driving route from the navigation system 112 to the target point set by the driver. The driving support unit 124 includes a mode setup unit 124a that sets up the driving modes to be allocated to the sections of the acquired driving route. The mode setup unit 124a constitutes a movement support apparatus and the functions thereof are carried out by causing the onboard controller 120 to execute a program or the like. The mode setup unit 124a has a function of setting up the driving mode of each section depending on the running loads of the sections of the driving route.

In general, it tends to be efficient that the running using the electric motor is applied to a section having a small running load and it tends to be efficient that the running using the internal combustion engine is applied to a section having a large running load. Accordingly, the onboard controller 120 allocates the EV mode to a section having a small running load and allocates the HV mode to a section having a large running load.

The mode setup unit 124a compares the running loads of plural target sections and sequentially allocates the EV mode to the sections having lower running loads. The mode setup unit 124a integrates the energy consumption of the sections to which the EV mode is allocated and subtracts the integrated energy consumption from the state of charge of the battery 110. Then, the mode setup unit 124a continues to allocate the EV mode to the sections of the driving route so that the integrated energy consumption is not greater than the state of charge of the battery 110. Accordingly, the mode setup unit 124a allocates the EV mode to the sections having a relatively low running load out of the sections of the driving route. The mode setup unit 124a allocates the HV mode to the sections to which the EV mode is not allocated.

Then, as described above, at the time of allocating the EV mode in sequence from the section in which the running load is low, when a section in which regenerative energy is obtained exists on the driving route, the remaining amount of the battery 110 may be used up before the section in which the regenerative energy is obtained. Therefore, when the section in which the regenerative energy is obtained exists in a section after the current location, the mode setup unit 124a preferentially sets up the HV mode for a section from a current section including the current location to a section before the section in which the regenerative energy is obtained. That is, the mode setup unit 124a allocates the EV mode in sequence from the section in which the running load is low by comparing the running loads of the respective sections on the driving route with each other, and thus changes the running load from the current location to the section before the section in which the regenerative energy is obtained to a virtual running load which is higher than a usual running load. As a result, the mode setup unit 124a does not allocate the EV mode as the driving mode from the current location to the section before the section in which the regenerative energy is obtained, but allocates the HV mode.

The mode setup unit 124a includes an energy threshold value which is a predetermined threshold value for comparing with the energy consumption in which the energy consumption of sections closer to the current location are added up in sequence. The mode setup unit 124a sets the virtual running load when the total energy consumption is higher than the energy threshold value. The total energy consumption usually increases when being added up, but decreases in the section where the regenerative energy is obtained, and thus may be below the energy threshold value. In addition, the mode setup unit 124a sets the virtual running load to be low in sequence from the section closer to the current location.

The mode setup unit 124a changes the running load according to a predetermined condition. The predetermined condition is a combination of a condition in which the regenerative energy in a section after the current location is higher than or equal to a regenerative threshold value, a condition in which a distance to the destination location is longer than or equal to a predetermined distance, a condition in which the remaining amount of the battery 110 is lower than a remaining amount threshold value which is a determination value of the remaining amount of the battery 110, and the like.

The mode setup unit 124a outputs the driving modes set up for the sections of the driving route to the display device 113 as described above and displays the driving mode set up for the section in which the vehicle is running on the display device 113.

The hybrid controller 108 specifies the current section in which the vehicle is currently running by appropriately acquiring position information at which the vehicle is currently running from the onboard controller 120, and causes the vehicle 100 to run in the driving mode set up for the specified section. That is, the hybrid controller 108 switches the driving mode of the vehicle 100 to the EV mode or the HV mode allocated to the corresponding section whenever the driving route of the vehicle 100 is changed. Accordingly, the vehicle 100 runs in the driving mode set up for the section (the current section) in which the vehicle is currently running.

Next, a setting-up process of the driving mode set up by the mode setup unit 124a of the driving support unit 124 will be described with reference to FIGS. 2A and 2B. The driving support unit 124 performs the setup of the driving mode with respect to each of the sections on the driving route every time the driving route is transmitted from the navigation system 112. In addition, the mode setup unit 124a performs the setup of the driving mode for each of uniform periods again. The period is defined as a setup period.

Figure 2A:
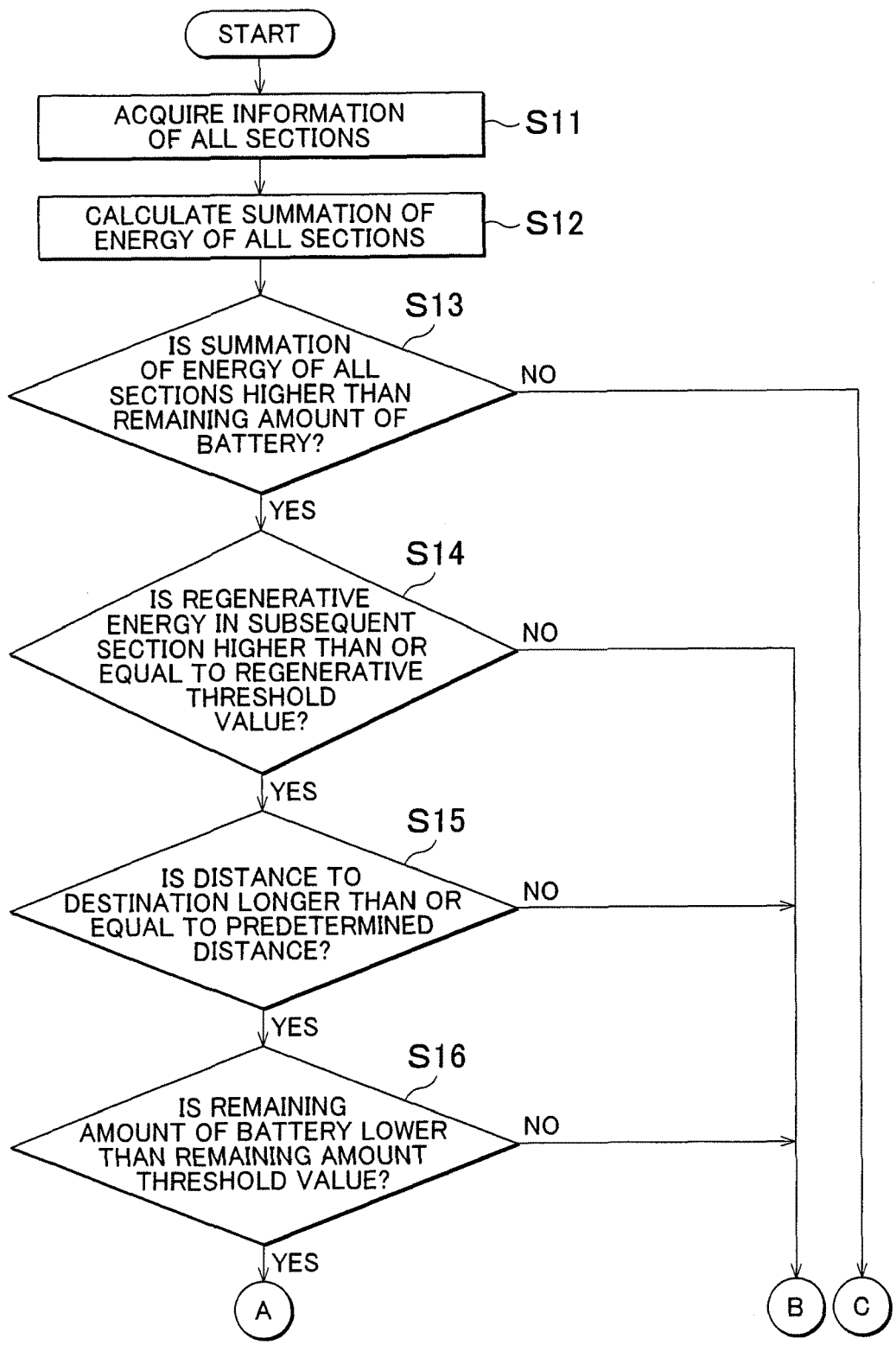

As illustrated in FIGS. 2A and 2B, when a target point is set by the navigation system 112, the driving support unit 124 acquires route information of all the sections of the driving route (step S11). Then, the driving support unit 124 calculates the total energy consumption on the basis of the acquired information on all the sections (step S12) and determines whether the total energy consumption of all the sections is greater than the state of charge of the battery 110 (step S13). That is, the mode setup unit 124a determines whether the vehicle can run in the EV mode in all the sections. When it is determined that the total energy consumption of all the sections is not greater than the state of charge of the battery 110 (NO in step S13), the driving support unit 124 allocates the EV mode to all the sections and ends the driving mode setting-up process.

On the other hand, when it is determined that the summation of the energy consumption of all the sections is higher than the remaining amount of the battery 110 (Step S13: YES), the driving support unit 124 determines whether or not the regenerative energy in a section after the current location is higher than or equal to the regenerative threshold value (Step S14). That is, the mode setup unit 124a determines whether or not an amount of the regenerative energy to be considered in the setup of the driving mode is obtained. When the driving support unit 124 determines that the regenerative energy in the section after the current location is lower than the regenerative threshold value (Step S14: NO), the process proceeds to Step S19.

On the other hand, when it is determined that the regenerative energy in the section after the current location is higher than or equal to the regenerative threshold value (Step S14: YES), the driving support unit 124 determines whether or not the distance to the destination location is longer than or equal to the predetermined distance (Step S15). That is, when the distance to the destination location is not so long, it is preferable to use up the battery 110 in the EV mode at an early point, and thus the mode setup unit 124a determines whether the distance to the destination location is not close. When the driving support unit 124 determines that the distance to the destination location is shorter than the predetermined distance (Step S15: NO), the process proceeds to Step S19.

On the other hand, when it is determined that the distance to the destination location is longer than or equal to the predetermined distance (Step S15: YES), the driving support unit 124 determines whether or not the remaining amount of the battery 110 is lower than the remaining amount threshold value (Step S16). That is, it is not necessary to consider the remaining amount of the battery 110 when the remaining amount is sufficient, and thus the mode setup unit 124a determines whether or not the remaining amount of the battery 110 is small. When the driving support unit 124 determines that the remaining amount of the battery 110 is higher than or equal to the remaining amount threshold value (Step S16: NO), the process proceeds to Step S19.

On the other hand, when it is determined that the remaining amount of the battery 110 is lower than the remaining amount threshold value (Step S16: YES), the driving support unit 124 sets an i section which is the current section including the current location to i=0, and sets a sum E of the energy consumption to E=E0 (Step S17).

Then, the driving support unit 124 determines whether or not the sum E of the energy consumption to the i section is lower than the energy threshold value (Step S18). That is, the mode setup unit 124a determines whether or not the sum of the energy consumption is lower than the energy threshold value due to obtaining the regenerative energy before the i section. Then, when it is determined that the sum E of the energy consumption to the i section is not lower than the energy threshold value (Step S18: NO), the driving support unit 124 sets the running load of the i section to the virtual running load ($\beta-c*i$) (Step S22). That is, the mode setup unit 124a sets the virtual running load ($\beta-c*0=\beta$) in a first section k1. Here, $\beta$ is an initial value of the virtual running load, and c is a predetermined amount. Furthermore, when the virtual running load is set in a subsequent section, a value which is decreased by the predetermined amount c is set as the virtual running load.

In order to determine the sum of the energy consumption to a section after the determined section, the driving support unit 124 sets i=i+1, and E=E+Ei (Step S23). Then, the driving support unit 124 determines whether or not the sum E of the energy consumption to the i section is lower than the energy threshold value again (Step S18).

On the other hand, when it is determined that the sum E of the energy consumption to the i section is lower than the energy threshold value (Step S18: YES), the driving support unit 124 specifies a section which is an allocation candidate of the EV mode among all the sections as a candidate section (Step S19). The driving support unit 124 allocates the EV mode for the specified candidate section, and allocates the HV mode for remaining sections (Step S20).

Next, the driving support unit 124 determines whether or not the remaining amount of the battery 110 is lower than the total energy consumption of the sections for which the EV mode is set (Step S21). When the driving support unit 124 determines that the remaining amount of the battery 110 is higher than or equal to the total energy consumption of the sections for which the EV mode is set (Step S21: NO), the process proceeds to Step S19. That is, when the remaining amount of the battery 110 is not sufficient, the mode setup unit 124a specifies the candidate sections for the EV mode again.

On the other hand, when it is determined that the remaining amount of the battery 110 is lower than the total energy consumption of the sections for which the EV mode is set (Step S21: YES), the driving support unit 124 ends the setup of the driving mode.

Furthermore, since the driving support unit 124 performs the setup of the driving mode with respect to the driving route for each setup period, when the remaining amount of the battery 110 is higher than or equal to the remaining amount threshold value due to charging the battery 110, the setup of the driving mode is performed without setting the virtual running load. Accordingly, when the driving mode has been changed by the virtual running load, the driving mode before being changed is set up.

Hereinafter, an operation of the movement support apparatus (the driving support system) according to this embodiment which is configured in this manner will be described with reference to FIG. 3 to FIG. 9. First, setting the virtual running load to part of the sections on the driving route by the mode setup unit 124a of the driving support unit 124 will be described with reference to FIG. 3 to FIG. 5. Furthermore, setting the virtual running load indicates that the running load is changed, and thus a state before setting the virtual running load is defined as a state before changing the running load, and a state after setting the virtual running load is defined as a state after changing the running load.

Figure 3:
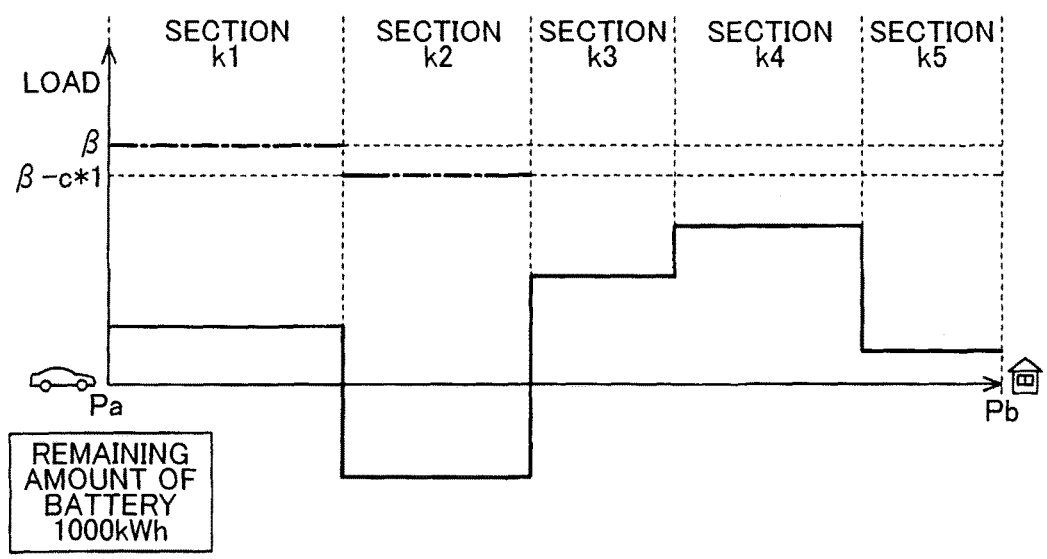
FIG. 3 is a diagram illustrating a driving route in which the driving mode is set up by the movement support apparatus according to the embodiment.

As illustrated in FIG. 3, on the driving route from a current location Pa to a destination location Pb, sections of a first section k1 to a fifth section k5 are included in the driving route searched for by the navigation system 112. The first section k1 corresponds to the current section including the current location Pa. The second section k2 corresponds to the subsequent section with respect to the current section. In addition, information related to the running load, the energy consumption, or the like in each section of the first section k1 to the fifth section k5 is obtained from the map information database 111. Furthermore, FIG. 3 is a graph illustrating an average value of the running loads when the vehicle 100 travels on the driving route. In addition, the remaining amount of the battery 110 in the vehicle 100 is 1000 kWh at a departure location.

As illustrated in FIG. 4, the energy consumption of each of the sections is set such that the first section k1 is set to 1200 kWh, the second section k2 is set to −1000 kWh, the third section k3 is set to 800 kWh, the fourth section k4 is set to 1000 kWh, and the fifth section k5 is set to 200 kWh. In addition, the sum of the energy consumption from the current location Pa to each of the sections is set such that a sum up to the first section k1 is set to 1200 kWh, a sum up to the second section k2 is set to 200 kWh, a sum up to the third section k3 is set to 1000 kWh, a sum up to the fourth section k4 is set to 2000 kWh, and a sum up to the fifth section k5 is set to 2200 kWh. Accordingly, the summation of the energy consumption of all the sections which is used in Step S13 of the setting-up process by the mode setup unit 124a is 2200 kWh. In addition, the sum of the energy consumption to the i section which is used in Step S18 of the setting-up process by the mode setup unit 124a is a sum to each of the sections described above. For example, i=0 is an initial section, and the i section is the first section k1. Then, the sum of the energy consumption for the i section is 1200 kWh.

As illustrated in FIG. 5, rankings of each of the sections on the driving route in order of the running loads from the lowest to the highest before changing the running load are as follows. The first place is the second section k2, the second place is the fifth section k5, the third place is the first section k1, the fourth place is the third section k3, and the fifth place is the fourth section k4 as understood from a solid line of FIG. 3.

At this time, when the driving support unit 124 allocates the driving mode according to an ascending order of the running loads described above, the vehicle travels in the EV mode before the section in which the regenerative energy is obtained, and thus the battery may be used up.

Therefore, as illustrated in FIG. 3, the mode setup unit 124a sets the virtual running load when the energy consumption which is obtained by adding up the energy consumption of the sections closer to the current location Pa in sequence is higher than the energy threshold value. That is, the mode setup unit 124a determines that the result is NO in Step S18 of FIG. 2B, and sets the virtual running load ($\beta$−c*1) in Step S22. Then, the running load of the first section k1 is virtual running load $\beta$ which is higher than the running loads of other sections. In the running load of the second section k2, the energy consumption obtained by adding up the energy consumption of the sections closer to the current location Pa is lower than the energy threshold value, and thus the virtual running load is not set, and the running load obtained from the map information database 111 is kept. That is, the mode setup unit 124a determines that the result is YES in Step S18 of FIG. 2B, and the process proceeds to Step S19, and thus the virtual running load is not set.

Accordingly, as illustrated in FIG. 5, the ascending order of the running load of each of the sections on the driving route after changing the running load is set such that the first place is the second section k2, the second place is the fifth section k5, the third place is the third section k3, the fourth place is the fourth section k4, and the fifth place is the first section k1.

Next, setting the driving mode with respect to each of the sections on the driving route by the mode setup unit 124a of the driving support unit 124 will be described with reference to FIG. 6 to FIG. 9. Furthermore, the state before changing the running load will be also described in order to compare with the state after changing the running load.

As illustrated in FIG. 6, the value obtained by adding up the energy consumption in sequence from the section in which the running load before being changed is low is as follows. Since the energy consumption of the second section k2 which is the first place is −1000 kWh, the sum of the energy consumption to the section which is the first place is −1000 kWh. Since the energy consumption of the fifth section k5 which is the second place is 200 kWh, the sum of the energy consumption to the section which is the second place is −1000+200=−800 kWh. Since the energy consumption of the first section k1 which is the third place is 1200 kWh, the sum of the energy consumption to the section which is the third place is −800+1200=400 kWh. Since the energy consumption of the third section k3 which is the fourth place is 800 kWh, the sum of the energy consumption to the section which is the fourth place is 400+800=1200 kWh. Since the energy consumption of the fourth section k4 which is the fifth place is 1000 kWh, the sum of the energy consumption to the section which is the fifth place is 1200+1000=2200 kWh. Accordingly, since the remaining amount of the battery 110 in the current location is 1000 kWh, the mode setup unit 124a allocates the HV mode for the driving mode of the third section k3 and for the driving mode of the fourth section k4 in which the sum of the energy consumption is higher than the remaining amount of the battery 110.

As illustrated in FIG. 7, when the driving mode is set up on the basis of the running load and the energy consumption of each of the sections before being changed, the driving support unit 124 sets up the EV mode for the first section k1 to the third section k3, and sets up the HV mode for the fourth section k4 and the fifth section k5. Then, the vehicle 100 travels first in the EV mode according to the plan, and the energy consumption of the first section k1 is 1200 kWh, and thus the battery is used up within the first section k1, and the vehicle travels in the HV mode after the location in which the battery is used up. That is, the vehicle travels in the HV mode in the second section k2 where the regenerative energy is obtained.

As illustrated in FIG. 8, the value obtained by adding up the energy consumption in sequence from the section in which the running load after being changed is low is as follows. The mode setup unit 124a adds up the energy consumption in order to compare with the remaining amount of the battery 110 in Step S21 of FIG. 2B. Since the energy consumption of the second section k2 which is the first place is −1000 kWh, the sum of the energy consumption to the section which is the first place is −1000 kWh. Since the energy consumption of the fifth section k5 which is the second place is 200 kWh, the sum of the energy consumption to the section which is the second place is −1000+200=−800 kWh. Since the energy consumption of the third section k3 which is the third place is 800 kWh, the sum of the energy consumption to the section which is the third place is −800+800=0 kWh. Since the energy consumption of the fourth section k4 which is the fourth place is 1000 kWh, the sum of the energy consumption to the section which is the fourth place is 0+1000=1000 kWh. Since the energy consumption of the first section k1 which is the fifth place is 1200 kWh, the sum of the energy consumption to the section which is the fifth place is 1000+1200=2200 kWh. Accordingly, since the remaining amount of the battery 110 in the current location Pa is 1000 kWh, the mode setup unit 124a allocates the HV mode for the first section k1 in which the sum of the energy consumption is higher than the remaining amount of the battery 110 according to Steps S19 to S21 of FIG. 2B.

As illustrated in FIG. 9, when the driving mode is set up on the basis of the running load and the energy consumption of each of the sections after being changed, the mode setup unit 124a sets up the HV mode for the first section k1 according to Step S20 of FIG. 2B, and sets up the EV mode for the second section k2 to the fifth section k5. Then, when the vehicle 100 travels according to the plan, the remaining amount of the battery 110 after travelling in the fifth section k5 is 0, and thus the battery is not used up during the course of the driving route, and the vehicle is able to travel in the driving mode identical to the plan.

Thus, in this embodiment, it is possible to provide the movement support apparatus, the movement support method, and the driving support system which are able to allocate a suitable driving mode to each of the sections on the driving route including the section in which the regenerative energy is able to be collected.

As described above, it is possible to achieve the following effects according to this embodiment. (1) When the driving route includes the section in which the regenerative energy higher than or equal to the regenerative threshold value is obtained, and the remaining amount of the battery 110 is lower than the remaining amount threshold value, the driving mode is set up using an aspect in which the HV mode is preferentially allocated for the section with the current section (the first section k1) including the current location Pa. For this reason, using up the electric power of the battery 110 due to travelling of the vehicle to the section in which the regenerative energy higher than or equal to the regenerative threshold value is obtained in the EV mode is suppressed, and thus the vehicle is able to travel in the section in which the regenerative energy is obtained in the EV mode. In addition, when there is a section in which the vehicle travels in the EV mode after the section having the regenerative energy obtained therein, travelling-in the HV mode instead of the EV mode due to using up the battery is suppressed. That is, setting the driving mode capable of being set up to only the HV mode due to using up the battery by frequently using the EV mode is suppressed. Accordingly, when the regenerative energy is expected to be collected in the driving route, it is possible to allocate a suitable driving mode for each of the sections.

(2) When the distance to the destination location Pb is longer than or equal to the predetermined distance, the driving mode is set up using the aspect in which the HV mode is preferentially allocated for the section with the current section (the first section k1) including the current location Pa. For this reason, the HV mode is preferentially set before the vehicle approaches the destination location Pb, on the contrary, when the vehicle approaches the destination location Pb, the HV mode is preferentially set, and thus setting of the EV mode using preserved energy of the battery 110 is promoted. Accordingly, the energy of the battery 110 is preserved until the vehicle approaches the destination location Pb, and the preserved energy of the battery 110 is used within a predetermined range from the destination location Pb, and thus energy of the battery 110 at the time of arriving at the destination location Pb does not unnecessarily remain. Accordingly, limited energy of the battery 110 is effectively used.

(3) The energy consumption is added up in sequence from each of the sections closer to the current location Pa on the driving route, and the virtual running load is set in the section where the total energy consumption is higher than the energy threshold value, and thus the running load of the corresponding section is assumed to be relatively higher than the running load of all section. Then, the HV mode and the EV mode are distributed according to a magnitude relationship of the running load, and thus the HV mode is set up for the section where the running load is assumed to be relatively high. That is, in the section where the regenerative energy is obtained, the total energy consumption is lower than the energy threshold value, and thus the EV mode is set up. Accordingly, it is possible to plan the HV mode for the driving mode in the section before the section where the regenerative energy is obtained.

(4) The virtual running load is set to be higher when the section is closer to the current location Pa on the driving route. For this reason, the HV mode is set up when the section is closer to the current location Pa, in other words, the HV mode is able to be set when the section is farther away from the section in which the regenerative energy is obtained.

Furthermore, the embodiments described above are able to be implemented by the following aspects in which the embodiments are suitably changed. In the above-mentioned embodiments, the CAN is used as the onboard network. The invention is not limited to this configuration, but other networks such as Ethernet (registered trademark), FlexRay (registered trademark), and IEEE1394 (FireWire (registered trademark)) may be used as the onboard network as long as they can connect the ECU and the like connected thereto so as to communicate. The networks including the CAN may be combined. Accordingly, it is possible to achieve improvement in a degree of freedom in configuration of the vehicle employing the movement support apparatus.

In the above-mentioned embodiments, the navigation system 112 and the driving support unit 124 are provided as different configurations. The invention is not limited to this configuration but the navigation system and the driving support unit may be provided as the same unit. Accordingly, it is possible to achieve improvement in a degree of freedom in configuration of the movement support apparatus.

In the above-mentioned embodiments, the hybrid controller 108 and the driving support unit 124 are provided as different configurations. The invention is not limited to this configuration, but the hybrid controller and the driving support unit may be provided as the same unit. Accordingly, it is possible to achieve improvement in a degree of freedom in configuration of the movement support apparatus.

In the above-mentioned embodiments, the units such as the navigation system 112, the display device 113, and the onboard controller 120 are incorporated into the vehicle 100. The invention is not limited to this configuration, but the units such as the navigation system, the display device, and the onboard controller may employ a portable information processor such as a mobile phone or a smart phone as all or a part of the functions thereof as long as they can communicate with each other. Accordingly, it is possible to achieve improvement in a degree of freedom in design of the movement support apparatus.

In the above-mentioned embodiments, the driving support unit 124, the navigation system 112, the map information database 111, and the like are incorporated into the vehicle 100. The invention is not limited to this configuration, but some functions of the driving support unit, the navigation system, the map information database, and the like may be disposed in an information processor outside the vehicle or may be disposed in a portable information processor. An example of the information process outside the vehicle is an information processing center and examples of the portable information processor include a mobile phone and a smart phone. The information processor outside the vehicle only has to transmit and receive information via a radio communication line. The portable information process may be connected to the onboard network, may be connected thereto by short-range communications, or may transmit and receive information via a radio communication line. Accordingly, it is possible to achieve improvement in a degree of freedom in design of the movement support apparatus.

In the above-mentioned embodiments, the running load of a section in a driving route is acquired or calculated from information included in the map information database. The invention is not limited to this configuration, but the running load of the section in the driving route may be acquired or calculated from a learning database. For example, as for a route in which the running is stored, the running load required for previously running in the route, which is stored in the learning database, can be used. Accordingly, it is possible to achieve improvement in a degree of freedom in design of the movement support apparatus.

In the above-mentioned embodiments, the EV mode is allocated in the ascending order in the running load of the sections. The invention is not limited to this configuration, but the EV mode may be allocated to the sections on the basis of one or more information pieces included in the map data such as the gradient of a road, a legal speed limit, and a road type, as long as the EV mode can be appropriately allocated. The EV mode may be allocated to the sections on the basis of the efficiency of the internal combustion engine or the efficiency of the battery. Accordingly, it is possible to achieve improvement in a degree of freedom in design of the movement support apparatus.

In the above-mentioned embodiments, the allocation of the driving mode is performed by the driving support unit 124. The invention is not limited to this configuration, but the allocation of the driving mode may be performed by the hybrid controller or the like. Accordingly, it is possible to achieve improvement in a degree of freedom in design of the movement support apparatus.

In the above-mentioned embodiments, the allocation of the driving mode is mainly performed when the position of the vehicle 100 is the current point Pa, but the allocation of the driving mode may be performed at any point of the driving route in which the vehicle moves to a destination Pb. The appropriate allocation of the driving mode to all the sections of the driving route can be performed at any point. Accordingly, it is possible to achieve improvement in a degree of freedom in design of the movement support apparatus.

In the above-mentioned embodiments, the virtual running load is set to sequentially decrease from a section close to the current point Pa in the driving route. However, the same virtual running load may be set. In the above-mentioned embodiments, the energy consumption is sequentially added from the section close to the current point Pa in the driving route, the virtual running load is set in a section in which the added consumption energy is greater than an energy threshold value, and the driving mode of a section having a relatively small running load including the virtual running load is set up to the EV mode. However, the HV mode may be set for a section before the section in which the regenerative energy is obtained.

In the embodiments described above, as the condition for the HV mode being preferentially set up for the section including at least any one of the current section including the current point Pa and the section after the current section, a case where the distance to the destination Pb is longer than or equal to the predetermined distance is included. However, when the HV mode is preferentially set up for the section including at least any one of the current section including the current point Pa and the section after the current section regardless of the distance to the destination Pb, the condition may be omitted.

In the embodiments described above, the HV mode is preferentially set up for the section including the current section. However, the HV mode may be preferentially set up for the section including the section after the current section. Thus, the number of times of changing the driving mode during the course of the travelling current section is suppressed, and thus it is possible to prevent the driver from experiencing an uncomfortable feeling.

In addition, the HV mode may be preferentially set up for the section including both of the current section and the section after the current section. Further, the HV mode may be preferentially set up for the section before the section in which the regenerative energy is obtained.

The invention claimed is:

1. A movement support apparatus that supports movement of a vehicle having an internal combustion engine and a motor as drive sources from a current location to a destination, comprising
a processor programmed to set up any driving mode of an EV mode in which the motor using a battery is used as the drive source and an HV mode in which at least the internal combustion engine is used as the drive source for each section, into which a driving route from the current location to the destination is partitioned, when a running load for running in each section is set, the processor setting up the driving mode using an aspect in which the HV mode is preferentially set up for a section including at least any one of a current section including the current location and a section after the current section when a remaining amount of the battery is lower than a remaining amount threshold value which is a determination value of the remaining amount of the battery, and regenerative energy obtained from information of the running load is higher than or equal to a regenerative threshold value which is a determination value for restoration from the remaining amount of the battery.

2. The movement support apparatus according to claim 1, wherein
the processor is programmed to perform setup of the driving mode under a condition in which a distance to the destination is longer than or equal to a predetermined distance.

3. The movement support apparatus according to claim 1, wherein
the processor is programmed to add up the energy consumption in sequence from each of the sections closer to the current location on the driving route, a virtual running load which is higher than the running load of each of the sections is set in a section in which the total energy consumption is higher than a predetermined threshold value, the EV mode is set up for the driving mode of a section in which the running load including the virtual running load is relatively low among each of the sections on the driving route, and the HV mode is set up for the driving mode of other sections.

4. The movement support apparatus according to claim 3, wherein
the processor is programmed to set the virtual running load to be low in sequence from sections closer to the current location on the driving route.

5. A movement support method which supports a movement from a current location to a destination of a vehicle including an internal combustion engine and a motor as a driving source, comprising:
setting up any one driving mode of an EV mode including the motor using a battery as the driving source and an HV mode including at least the internal combustion engine as the driving source for each section while setting a running load at the time of travelling in each of the sections in the EV mode as the driving mode, in each of the sections into which a driving route from the current location to the destination is divided; and
setting up the driving mode using an aspect in which the HV mode is preferentially set up for a section including at least any one of a current section including the current location and a section after the current section when a remaining amount of the battery is lower than a remaining amount threshold value which is a determination value of the remaining amount of the battery, and regenerative energy obtained from information of the running load is higher than or equal to a regenerative threshold value which is a determination value of a restoration of the remaining amount of the battery.

6. The movement support method according to claim 5, wherein
the driving mode is set up under a condition in which a distance to the destination is longer than or equal to a predetermined distance.

7. A movement support apparatus that supports a movement from a current location to a destination of a vehicle including an internal combustion engine and a motor as a driving source, comprising
a processor programmed to set up any one driving mode of an EV mode including the motor using a battery as the driving source and an HV mode including at least the internal combustion engine as the driving source for each section while setting a running load at the time of travelling in each of the sections in the EV mode as the driving mode, in each of the sections into which a driving route from the current location to the destination is divided, the processor setting up the driving mode using an aspect in which the HV mode is preferentially set up for a section before a section in which regenerative energy is obtained when a remaining amount of the battery is lower than a remaining amount threshold value which is a determination value of the remaining amount of the battery, and the regenerative energy obtained from information of the running load is higher than or equal to a regenerative threshold value which is a determination value of a restoration of the remaining amount of the battery.

8. A movement support method that supports a movement from a current location to a destination of a vehicle including an internal combustion engine and a motor as a driving source, comprising:
setting up any one driving mode of an EV mode including the motor using a battery as the driving source and an HV mode including at least the internal combustion engine as the driving source for each section while setting a running load at the time of travelling in each of the sections in the EV mode as the driving mode, in each of the sections into which a driving route from the current location to the destination is divided; and
setting up the driving mode using an aspect in which the HV mode is preferentially set up for a section before a section in which regenerative energy is obtained when a remaining amount of the battery is lower than a remaining amount threshold value which is a determination value of the remaining amount of the battery, and the regenerative energy obtained from information of the running load is higher than or equal to a regenerative threshold value which is a determination value of a restoration of the remaining amount of the battery.

9. A driving support system that supports driving of a vehicle on the basis of one driving mode selected from a plurality of different driving modes set up for each section into which a driving route from a current location to a destination of the vehicle including an internal combustion engine and a motor as a driving source is divided, comprising a movement support apparatus that sets up the one driving mode selected from the plurality of driving modes for each of the sections on the driving route, the movement support apparatus including a processor programmed to set up any driving mode of an EV mode in which the motor using a battery is used as the drive source and an HV mode in which at least the internal combustion engine is used as the drive source for each section, into which a driving route from the current location to the destination is partitioned, when a running load for running in each section is set, the processor setting up the driving mode using an aspect in which the HV mode is preferentially set up for a section including at least any one of a current section including the current location and a section after the current section when a remaining amount of the battery is lower than a remaining amount threshold value which is a determination value of the remaining amount of the battery, and regenerative energy obtained from information of the running load is higher than or equal to a regenerative threshold value which is a determination value of a restoration of the remaining amount of the battery.

* * * * *